(12) United States Patent
Smith

(10) Patent No.: US 11,235,771 B2
(45) Date of Patent: Feb. 1, 2022

(54) AXLE RANGE SHIFT-ASSIST FOR AUXILIARY BRAKING

(71) Applicant: Dana Heavy Vehicle Systems Group, LLC, Maumee, OH (US)

(72) Inventor: Scott A. Smith, Maumee, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/083,196

(22) Filed: Oct. 28, 2020

(65) Prior Publication Data
US 2021/0039646 A1 Feb. 11, 2021

Related U.S. Application Data

(62) Division of application No. 15/950,623, filed on Apr. 11, 2018, now Pat. No. 10,850,735.

(60) Provisional application No. 62/484,270, filed on Apr. 11, 2017.

(51) Int. Cl.
| B60K 23/08 | (2006.01) |
|---|---|
| B60W 10/02 | (2006.01) |
| B60W 10/196 | (2012.01) |
| B60W 10/198 | (2012.01) |
| B60W 30/18 | (2012.01) |
| B60T 8/32 | (2006.01) |
| B60W 10/06 | (2006.01) |
| B60W 30/182 | (2020.01) |

(52) U.S. Cl.
CPC ....... *B60W 30/18136* (2013.01); *B60K 23/08* (2013.01); *B60T 8/322* (2013.01); *B60T 8/3215* (2013.01); *B60W 10/02* (2013.01); *B60W 10/196* (2013.01); *B60W 10/198* (2013.01); *B60W 30/18109* (2013.01); *B60K 2023/085* (2013.01); *B60W 10/06* (2013.01); *B60W 30/182* (2013.01); *B60W 2300/126* (2013.01); *B60W 2510/0638* (2013.01); *B60W 2510/0657* (2013.01); *B60W 2552/15* (2020.02)

(58) Field of Classification Search
CPC .. B60K 2023/085; B60K 23/08; B60K 17/36; B60W 2300/126; B60W 30/18136; B60W 30/18109; B60W 30/182; B60W 10/198; B60W 10/02; B60W 10/196; B60W 10/06; B60W 2552/15; B60W 2510/0638; B60W 2510/0657; B60T 2201/04; B60T 8/3215; B60T 8/322; B60T 8/329; B60T 13/586
USPC ........ 180/370, 244, 248; 477/94; 701/69, 70
See application file for complete search history.

(56) References Cited

U.S. PATENT DOCUMENTS

| 4,468,519 A | 8/1984 | Krapcho |
|---|---|---|
| 4,617,840 A | 10/1986 | Yamakawa et al. |
| 5,248,020 A | 9/1993 | Kreitzberg |
| 5,441,136 A | 8/1995 | Greaves et al. |
| 5,893,892 A | 4/1999 | Loeffler |
| 6,877,573 B2 | 4/2005 | Hasegawa |
| 7,168,518 B2 | 1/2007 | Ima |
| 7,682,277 B2 | 3/2010 | Yang |

(Continued)

*Primary Examiner* — Keith J Frisby
(74) *Attorney, Agent, or Firm* — McCoy Russell LLP

(57) ABSTRACT

A vehicle driveline including a first axle assembly having a first drive ratio. A second axle assembly in selective driving engagement with the first axle assembly, the first and second axle assemblies having a second drive ratio when in driving engagement. A control system in electrical communication with the first and second axle assemblies, wherein the control system selectively engages the second axle assembly with the first axle assembly.

14 Claims, 2 Drawing Sheets

(56) References Cited

U.S. PATENT DOCUMENTS

| | | |
|---|---|---|
| 7,870,925 B2 | 1/2011 | Perakes et al. |
| 8,482,397 B1 | 7/2013 | Tajiri |
| 8,958,965 B2 | 2/2015 | Perkins et al. |
| 9,020,715 B2 | 4/2015 | Nellums et al. |
| 9,031,728 B2 | 5/2015 | Im |
| 2008/0167161 A1 | 7/2008 | Mitchell et al. |

AXLE RANGE SHIFT-ASSIST FOR AUXILIARY BRAKING

CROSS-REFERENCE TO RELATED APPLICATIONS

The present application is a divisional of U.S. Non-Provisional patent application Ser. No. 15/950,623, entitled "AXLE RANGE SHIFT-ASSIST FOR AUXILIARY BRAKING", and filed on Apr. 11, 2018. U.S. Non-Provisional patent application Ser. No. 15/950,623 claims priority to U.S. Provisional Application No. 62/484,270, entitled "AXLE RANGE SHIFT-ASSIST FOR AUXILIARY BRAKING", and filed on Apr. 11, 2017. The entire contents of the above-listed applications are hereby incorporated by reference for all purposes.

BACKGROUND

The present disclosure relates to auxiliary braking systems and more particularly to control features for auxiliary braking apparatuses in a system having two or more drive axles.

Commercial vehicles may utilize both foundation braking apparatuses and auxiliary braking apparatuses. Conventional foundation braking apparatuses, also referred to as service brakes, may be disposed proximate to wheel-end assemblies and utilize friction to arrest vehicle motion. Foundation braking apparatuses include, but are not limited to, pad or shoe type brakes such as drum brakes and disc brakes.

Engine downspeeding negatively effects the performance of many auxiliary braking apparatuses. In other words, the efficacy of many auxiliary braking apparatuses is positively related to engine speed. In view of the above, there remains a need for a system which may increase engine speed during the operation of auxiliary braking apparatuses.

SUMMARY

In one form, the present disclosure provides for a vehicle driveline including a first axle assembly having a first drive ratio, and a second axle assembly in selective driving engagement with the first axle assembly. Wherein the first and second axle assemblies have a second drive ratio when in driving engagement. The vehicle driveline may also include a control system in electrical communication with the first and second axle assemblies, wherein the control system selectively engages the second axle assembly with the first axle assembly.

In another form, the present disclosure provides for a method of operating a vehicle driveline, including providing a first axle assembly having a first drive ratio, and providing a second axle assembly in selective driving engagement with the first axle assembly. Wherein the first and second axle assemblies have a second drive ratio when in driving engagement. The method of operating a vehicle driveline may also include providing a control system in electrical communication with the first and second axle assemblies and providing an auxiliary braking system in electrical communication with the control system. The method of operating a vehicle driveline may further include detecting engagement of the auxiliary braking system, and engaging the second axle assembly with the first axle assembly via the control system.

In another form, the present disclosure provides for a method of operating a vehicle driveline, including providing a first axle assembly having a first drive ratio and providing a second axle assembly in selective driving engagement with said first axle assembly. Wherein the first and second axle assemblies have a second drive ratio when in driving engagement. The method of operating a vehicle driveline may also include providing a control system in electrical communication with the first and second axle assemblies. The method of operating a vehicle driveline may further include detecting a vehicle operating parameter, and engaging the second axle assembly with the first axle assembly via the control system.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
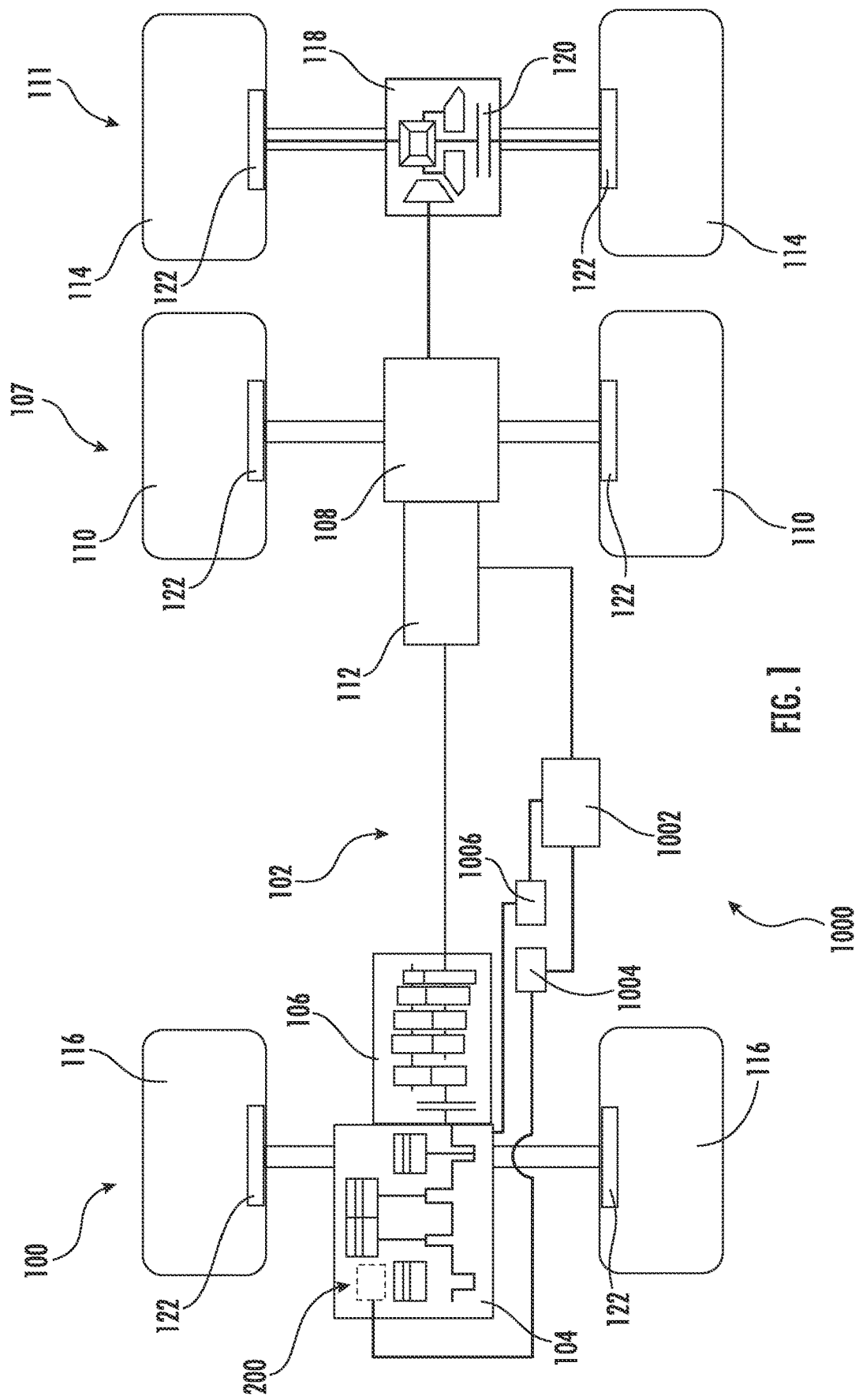
FIG. 1 illustrates a schematic view of a vehicle driveline according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a vehicle control system 1000 for auxiliary braking apparatuses are described below. In certain embodiments, the vehicle control system 1000 is utilized with a vehicle 100 as illustrated in FIG. 1. The vehicle control system 1000 may have applications in both light duty and heavy duty vehicles, and for passenger, commercial, and off-highway vehicles. It would be understood by one of ordinary skill in the art that the vehicle control system 1000 also has industrial, locomotive, military, agricultural, and aerospace applications, as well as applications in passenger, electric, and autonomous or semi-autonomous vehicles.

Auxiliary braking apparatuses include mechanisms which supplement the stopping capability of foundation braking apparatuses. Conventional foundation braking apparatuses become overheated with prolonged use. The overheating of conventional foundation braking apparatuses inhibits their efficacy. Auxiliary braking apparatuses may be utilized in conjunction with foundation braking apparatuses to reduce or prevent the overheating of the foundation braking apparatus. Auxiliary braking apparatuses also reduce wear on foundation braking apparatuses and decrease vehicle stopping distance.

Figure 3:
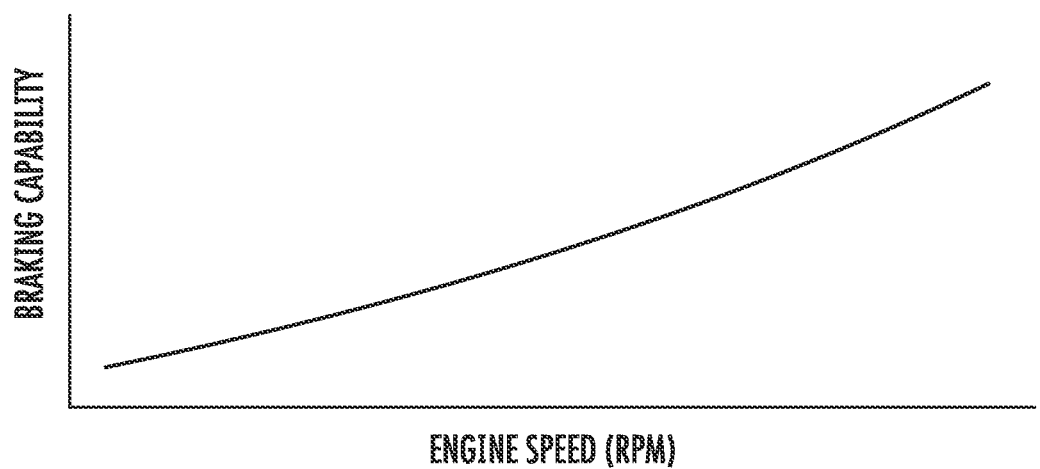
FIG. 3 depicts a graphical illustration of the relationship between auxiliary braking capability and engine speed.

In an embodiment, the vehicle 100 may utilize engine downspeeding and a 6×2 axle state in the pursuit of greater fuel efficiency. Engine downspeeding as referenced herein indicates a reduction in the revolutions per minute ("rpm") of the engine crankshaft. For example, downspeeding an engine to 1100-1200 rpm and applying a faster speed reduction ratio to generate normal horsepower at cruising speed (e.g., approximately 200 hp), substantially increases fuel efficiency. However, as illustrated in FIG. 3, the efficacy of the auxiliary braking apparatuses utilized by the vehicle 100 is positively related to engine speed affected by the engine downspeeding.

In an embodiment, as illustrated in FIG. 1, the vehicle 100 may comprise a driveline arrangement 102 having a longitudinally disposed power source 104. The power source 104 may be, but is not limited to, an internal combustion engine or an electric motor. In addition, the driveline arrangement 102 may include a transmission 106 having an input driveably connected to the power source 104, and an output driveably connected to a first axle assembly 107. The first axle assembly 107 may comprise a differential mechanism 108 driveably connected with the output of the transmission 106. The differential mechanism 108 may also be driveably connected to a primary wheel-set 110.

In an embodiment, as illustrated in FIG. 1, the vehicle 100 may be a tandem axle vehicle comprising a second axle assembly 111. The first axle assembly 107 may include a power transfer unit 112 driveably connected to the transmission 106 output, and selectively driveably connected to a secondary wheel-set 114 of the second axle assembly 111. The second axle assembly 111 may also include a rear drive unit 118 having a clutch 120. When a 6×4 axle state is not required, the rear drive unit clutch 120 and the power transfer unit 112 are utilized to disconnect the secondary wheel-set 114 and the associated driveline components to provide improved fuel economy. The primary and secondary wheel-sets 110, 114 and a front axle wheel-set 116 may each include a foundation brake 122.

The vehicle 100 may operate in at least two axle states, a 6×4 axle state and a 6×2 axle state. The 6×4 axle state may be utilized during acceleration from vehicle stop, and in low speed operations. The 6×2 axle state may be utilized when the vehicle 100 achieves highway cruising speeds. The 6×4 and 6×2 axle states apply discretely variable speed reduction ratios from the propeller shaft to the primary and secondary wheel-sets 110, 114. In an embodiment, the 6×2 axle state may utilize a 2:1 speed reduction, and the 6×4 axle state may utilize a 3:1 speed reduction. The speed reduction ratios may also be referred to as drive ratios herein. The 6×2 axle state utilizes a faster final drive ratio than the 6×4 axle state to maintain the required horsepower during engine downspeeding.

In an embodiment, the vehicle control system 1000 may comprise a controller 1002. The vehicle control system 1000 may also comprise an auxiliary brake sensor 1004 in electrical communication with the controller 1002. The auxiliary brake sensor 1004 may be utilized to detect the execution of an auxiliary braking apparatus 200. In an embodiment, the auxiliary braking apparatus 200 may comprise an engine compression retarder. An engine compression retarder releases compressed gas in the engine cylinders through the engine exhaust valves such that no energy is transferred to the engine crankshaft.

In another embodiment, the auxiliary braking apparatus 200 may be an engine exhaust retarder. In an engine exhaust retarder, exhaust is restricted by a valve (not depicted) such that energy is utilized to expel the exhaust and not transferred to the engine crankshaft. In yet another embodiment, the auxiliary braking apparatus 200 may be an eddy-current brake. An eddy-current brake utilizes an electromagnet to create a magnetic field in an adjacent ferromagnetic portion of the vehicle 100. One of the electromagnet or the ferromagnetic portions rotates in relation to a wheel-set. A drag force acting on the electromagnet and the ferromagnetic portions disperses kinetic energy.

Figure 2:
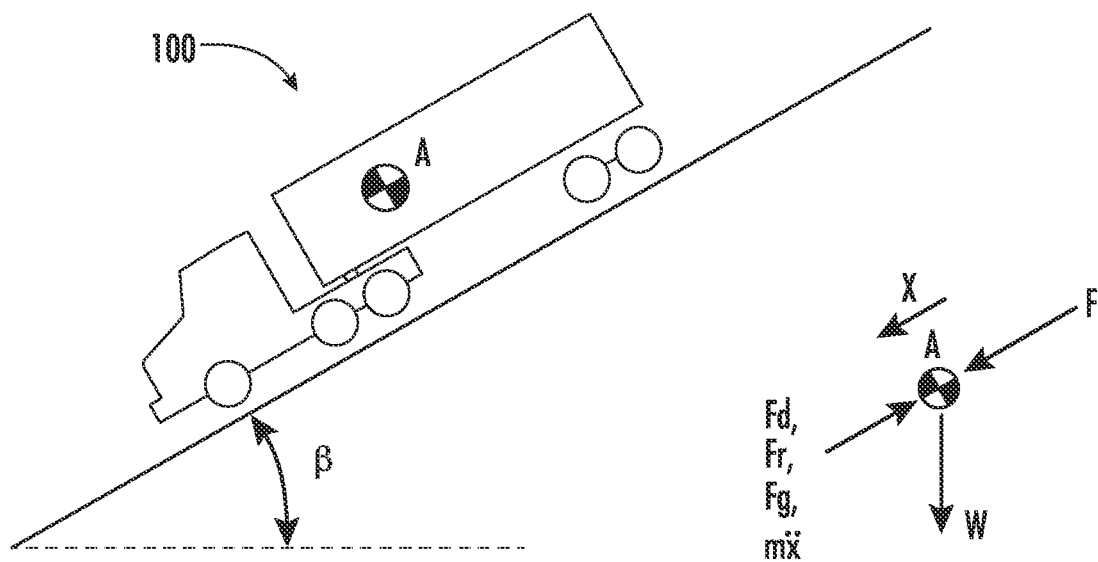
FIG. 2 illustrates forces that may act on the vehicle of FIG. 1 when disposed at an angle $\beta$.

Referring now to FIG. 2, the vehicle 100 may experience a number of forces F, $F_d$, $F_r$, $F_g$, and $m_{\ddot{x}}$ when disposed at an angle β. F represents the tractive effort, $F_d$ represents the aerodynamic drag, $F_r$ represents the rolling resistance, $F_g$ represents the grade load, and $m_{\ddot{x}}$ represents the inertial load. The tractive effort F comprises the forces delivered at the interface of the driving surface and the primary, secondary, and front axle wheel-sets 110, 114, 116.

In an embodiment, as illustrated in FIG. 1, the vehicle control system 1000 may also comprise a condition sensor 1006 in electrical communication with the controller 1002. The condition sensor 1006 may be utilized in conjunction with, or instead of, the auxiliary brake sensor 1004. The condition sensor 1006 detects a predetermined condition, such as, but not limited to, a predetermined terrain grade (e.g., hill descent), in which the operation of the auxiliary braking apparatus 200 will be utilized. After detection of the predetermined condition by the auxiliary brake sensor 1004 and/or the condition sensor 1006, the controller 1002 commands the vehicle 100 to shift into the 6×4 axle state having a higher reduction ratio than the 6×2 axle state.

The auxiliary brake sensor 1004 may determine a state, active or inactive, of the auxiliary braking apparatus 200 in a number of ways. In an embodiment, the auxiliary brake sensor 1004 may determine the state of the auxiliary braking apparatus 200 through direct electromechanical integration with the auxiliary braking apparatus 200. In another embodiment, the auxiliary brake sensor 1004 may determine the state of the auxiliary braking apparatus 200 via vehicle 100 controller area network ("CAN") bus querying. In yet another embodiment, the auxiliary brake sensor 1004 may determine the state of an auxiliary braking apparatus 200 via algorithmic inference.

In the embodiment where the auxiliary brake sensor 1004 is coupled with the auxiliary braking apparatus 200 via direct electromechanical integration, the auxiliary braking apparatus 200 may comprise a switch (not depicted) in communication with the controller 1002. The switch may indicate to the controller 1002 when the auxiliary braking apparatus 200 is active.

In the embodiment where the auxiliary brake sensor 1004 determines the state of the auxiliary braking apparatus 200 via vehicle 100 CAN bus querying, the controller 1002 may receive a message, or signal, through the vehicle 100 CAN bus indicating the state of the auxiliary braking apparatus 200.

In the embodiment where the auxiliary brake sensor 1004 determines the state of the auxiliary braking apparatus 200 via algorithmic inference, a number of vehicle operating parameters may be utilized as inputs to the auxiliary braking apparatus 200 state inference algorithm. The auxiliary braking apparatus 200 inference algorithm determines the state of the auxiliary braking apparatus 200 and commands the vehicle 100 to shift into the 6×4 axle state having a higher reduction ratio, when the auxiliary braking apparatus 200 is active. In an embodiment, the vehicle operating parameters may include, but are not limited to, engine speed, engine net output torque, and terrain grade. The auxiliary braking apparatus 200 state inference algorithm may be integrated into the controller 1002.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof.

The embodiments described above are therefore to be considered in all respects as illustrative, not restrictive.

What is claimed is:

1. A vehicle driveline, comprising:
   a first axle assembly having a first drive ratio;
   a second axle assembly in selective driving engagement with said first axle assembly, said first and second axle assemblies having a second drive ratio when in driving engagement;
   an auxiliary braking system; and
   a control system in electrical communication with said first and second axle assemblies, wherein said control system selectively engages said second axle assembly with said first axle assembly in response to an auxiliary braking apparatus being in an active state.

2. The vehicle driveline of claim 1, wherein the auxiliary braking system comprises a compression retarder.

3. The vehicle driveline of claim 2, further comprising:
   an auxiliary brake sensor in electrical communication with said control system, whereby said control system detects execution of said auxiliary braking apparatus.

4. The vehicle driveline of claim 3, wherein said auxiliary brake sensor is integrated with said auxiliary braking apparatus.

5. The vehicle driveline of claim 2, further comprising:
   a condition sensor in electrical communication with said control system, whereby said control system detects execution of said auxiliary braking apparatus.

6. The vehicle driveline of claim 1, further comprising a controller area network, and wherein said control system determines a state of the auxiliary braking system via the controller area network.

7. The vehicle driveline of claim 1, wherein said auxiliary braking apparatus comprises an engine exhaust retarder.

8. The vehicle driveline of claim 1, wherein said auxiliary braking apparatus comprises an eddy-current brake.

9. A vehicle driveline, comprising:
   a first axle assembly having a first drive ratio;
   a second axle assembly in selective driving engagement with said first axle assembly, said first and second axle assemblies having a second drive ratio when in driving engagement;
   an auxiliary braking system; and
   a control system in electrical communication with said first and second axle assemblies, wherein said control system couples the first axle to the second axle during a first condition when a vehicle's speed is increasing, wherein said control system decouples the second axle from the first axle during a second condition when the vehicle's speed is increasing, and wherein the control system selectively engages said second axle assembly with said first axle assembly in response to an auxiliary braking apparatus being in an active state.

10. The vehicle driveline of claim 9, wherein the auxiliary braking system comprises a compression retarder.

11. The vehicle driveline of claim 9, wherein said first condition is a first vehicle speed.

12. The vehicle driveline of claim 11, wherein said second condition is a second vehicle speed.

13. The vehicle driveline of claim 9, wherein said control system determines an operating state of the auxiliary braking system.

14. The vehicle driveline of claim 9, wherein the second axle assembly includes a clutch.

* * * * *